(No Model.)

J. N. LE VASSEUR DIT BELISLE.
HOOF PROTECTING PLATE.

No. 562,085. Patented June 16, 1896.

Witnesses.
Edgar E. Mann
A. E. Mann

Inventor.
J. N. Le Vasseur dit Belisle.

UNITED STATES PATENT OFFICE.

JOSEPH N. LE VASSEUR DIT BELISLE, OF MANCHESTER, NEW HAMPSHIRE.

HOOF-PROTECTING PLATE.

SPECIFICATION forming part of Letters Patent No. 562,085, dated June 16, 1896.

Application filed November 15, 1895. Serial No. 569,122. (No model.)

*To all whom it may concern:*

Be it known that I, JOSEPH NAIPOLDER LE VASSEUR DIT BELISLE, a citizen of the United States, residing at Manchester, in the county of Hillsborough and State of New Hampshire, have invented certain new and useful Improvements in Expanding Horseshoe-Plates; and I do hereby declare that the following is a full, clear, and exact description of the invention, which will enable others skilled in the art to which it appertains to use the same.

My invention relates to improvements in pressure-pads for horseshoes, the objects in view being to produce a pressure-pad of simple construction and which can be cheaply manufactured, the same being designed to be interposed between the bottom of the wall of the hoof and the shoe and to guard the frog of the foot from injury by contacting with hard substances, such as sharp stones, and becoming thereby bruised, and, furthermore, to adapt such pad to yield to pressure of such contact and to provide for a thorough ventilation of the hoof.

Figure 1:
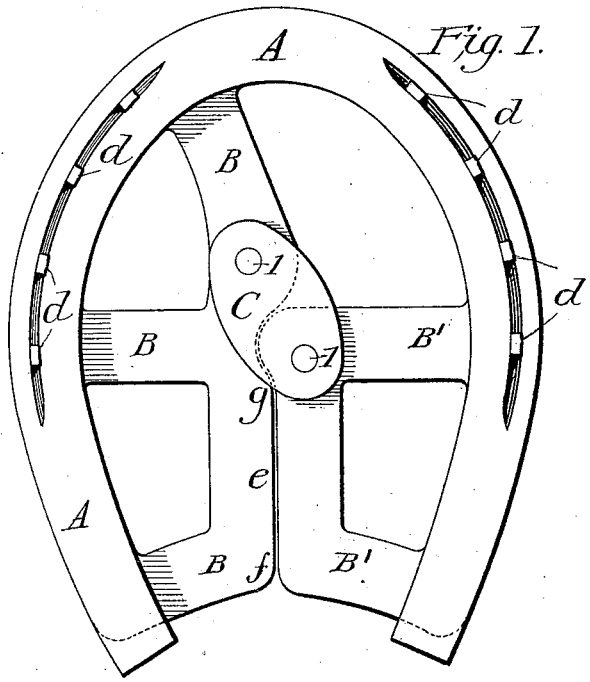
Figure 2:
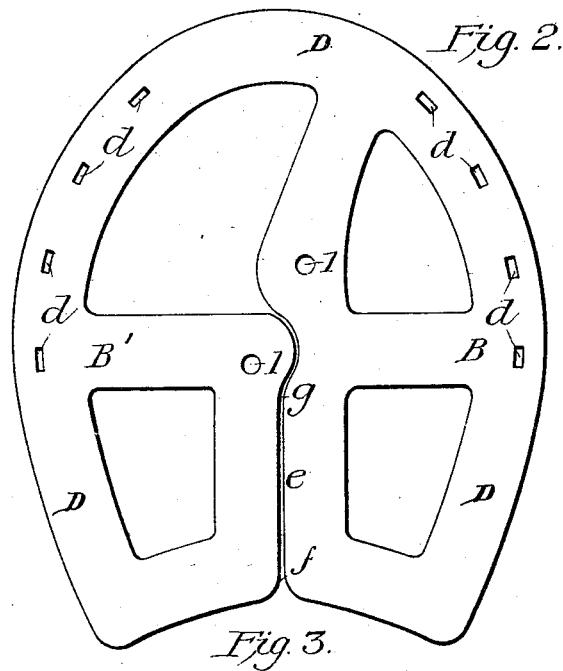
Figure 3:
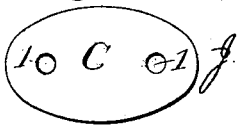

Referring to the drawings, Figure 1 is a bottom plan of a horseshoe with my improved pad in position. Fig. 2 is a detail of the pad. Fig. 3 is a detail of the swivel connection hereinafter described.

Like letters of reference indicate like parts in all the figures of the drawings.

In practicing my invention I construct the pad of any suitable sheet metal, but preferably of brass, as the same is yielding and will not rust from exposure. The pad is exteriorly formed and proportioned to correspond to a horseshoe A, and consists of the outer horseshoe-shaped rim D, in which is formed a series of nail-holes $d$.

The pad is subsequently halved, the cut $e$ extending from the heel portion $f$ to near the toe portion, but leaving the rim D at the toe portion intact. By reason of this cut opposite independently-movable halves B and B' are produced, and these are provided with openings or cavities at any suitable point, so as to lighten the pad as a whole and provide for a circulation of air. The cut $e$ is curved at about the center, as shown at $g$, Fig. 2, so that the edge of one of the sections is recessed to receive the corresponding projecting edge of the companion section. It will thus be seen that while the two sections are capable of a certain amount of vertical independent motion the longitudinal strain does not fall entirely upon the front portion of the rim D, but is borne equally by the interlocking of the two sections at the edges $g$.

The two sections B and B' are, at opposite sides of the interlocking point $g$, provided with diagonally opposite rivets $l$, which pass through said sections and also through the ends of a diagonally-disposed swivel-plate C.

In operation the pad is inserted between the bottom of the wall of the hoof and upper side of the horseshoe, and is retained in position by means of the nails of the latter. By use of the pad all bruising of the frog or tender portions of the hoof is obviated, and yet at the same time the pad is capable of yielding so as to permit the hoof to gain a firm hold upon the ground, and I accomplish the same with but a slight added weight to the shoe and at a slight expenditure.

Having described my invention, what I claim is—

1. The improved hoof-pad, the same consisting of the opposite halves connected by the integral rim, said halves being separated at about the center of the pad from the heel to a point in rear of the front portion of the rim, the edges of said halves interlocking in rear of said point so as to resist longitudinal strain, substantially as specified.

2. The herein-described improved pad for hoofs, the same consisting of the opposite sections B and B' having the curved interlocking edges $g$ and separated on the line $e$ from the rear central portion of the pad to a point near the toe, the shoe-shaped integral rim D, and the swivel-plate C riveted to the opposite sections B and B', substantially as specified.

J. N. LE VASSEUR DIT BELISLE.

Witnesses:
  A. E. MANN,
  E. E. MANN.